Figure 6:
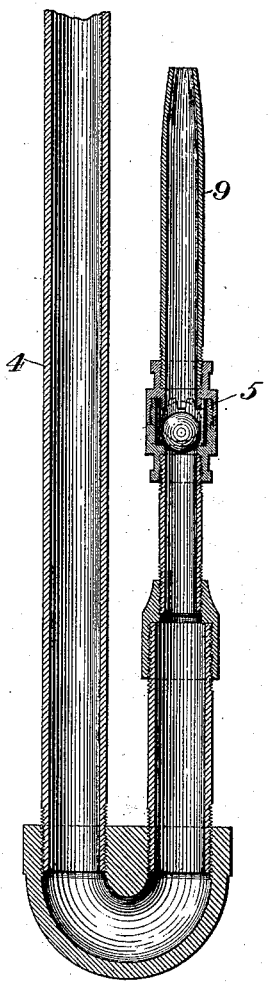

(No Model.) 2 Sheets—Sheet 1.
C. N. ROYCE.
OPERATION OF OIL WELLS.
No. 344,137. Patented June 22, 1886.
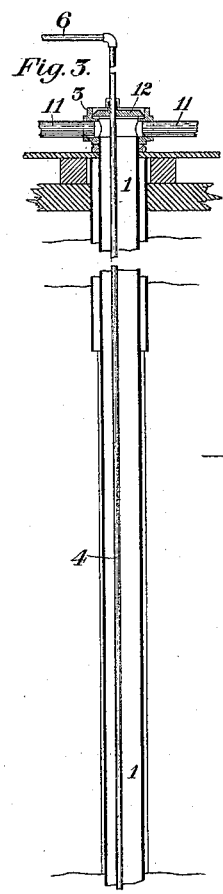
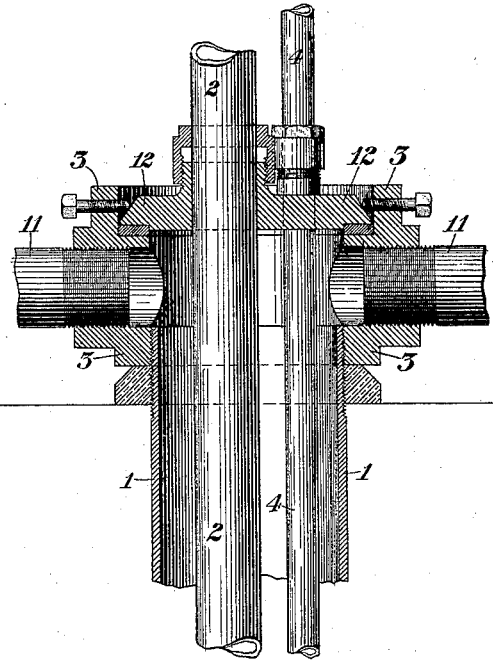
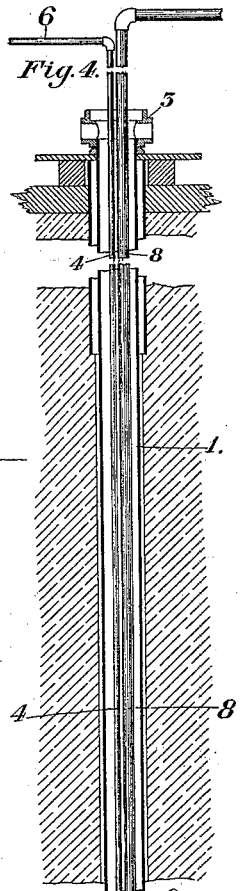
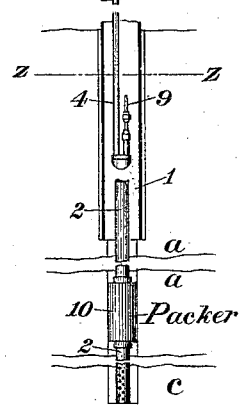
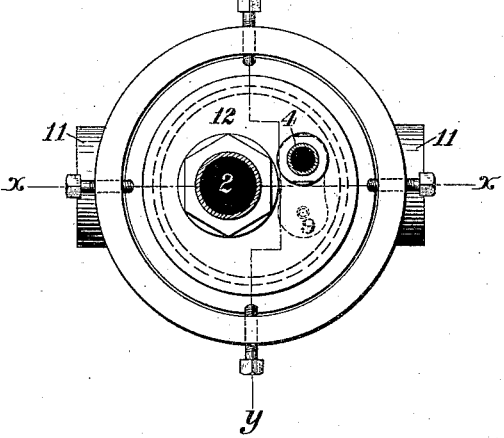
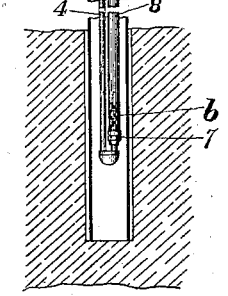
Witnesses
Harry L. Gill
J. A. Burns,
Inventor.
Charles N. Royce
by Bakewell & Kerr
his Attorneys (No Model.) 2 Sheets—Sheet 2.

C. N. ROYCE.
OPERATION OF OIL WELLS.

No. 344,137. Patented June 22, 1886.

Witnesses.
Harry L. Gill
J. A. Burns.

Inventor.
Charles N. Royce
by Bakewell & Kerr
his Attorneys

UNITED STATES PATENT OFFICE.

CHARLES N. ROYCE, OF PHILLIPSTON, PENNSYLVANIA.

OPERATION OF OIL-WELLS.

SPECIFICATION forming part of Letters Patent No. 344,137, dated June 22, 1886.

Application filed April 30, 1886. Serial No. 200,685. (No model.)

*To all whom it may concern:*

Be it known that I, CHARLES N. ROYCE, of Phillipston, in the county of Clarion and State of Pennsylvania, have invented a new and useful Improvement in the Operation of Oil-Wells; and I do hereby declare the following to be a full, clear, and exact description thereof.

There are many wells in the oil regions of this country which are of small production, and which, because they have not sufficient gas to be self-flowing, must be pumped with engines. The maintenance of the engines, pumps, &c., entails so much cost relatively to the net value of the oil produced that very little profit is made from them.

It is the principal object of my invention to supply means whereby such wells may be worked at a saving of expense and labor; and to this end it consists in utilizing the pressure of natural gas, either at the time of its liberation or subsequent thereto, by applying said gas to the oil from non-flowing strata, substantially as will hereinafter more fully appear. The effect of this jet is, that mixing with the oil it causes it to assume a light, yeasty consistency, enabling it, by reason of its diminished specific gravity, to be easily forced out of the well, and, secondly, when the gas-jet is directed upward its effect is to induce and force the oil to the top of the well in a constant stream or spray, thereby making the well a flowing well.

It has been proposed to pump oil-wells by the use of an ejector-pump placed at the bottom of the well and discharging a jet of steam or compressed air-gas upward; but these schemes have not been successful, in so far as air, steam, and gas (not natural gas) are concerned, for various reasons: First, it is impracticable to carry steam so far into the earth without condensation; second, with use of compressed air the power necessary to compress it costs as much or more than the maintenance of the ordinary sucker-rod pump, and it is not so good; third, neither air, steam, nor ordinary gases will appreciably mingle with the oil so as to lighten it; hence they are quite insufficient to raise the oil through such great distances, as in oil-wells, without requiring such an expense of compressing-power as is impracticable to secure with economy and advantage. The use of natural gas is not subject to these objections. It lightens the oil, makes it flow easily, and is, generally speaking, very easy to obtain at the desired pressure in the vicinity of oil-wells from a flowing well.

I will now describe my improvement with reference to the accompanying drawings, in which—

Figure 7:
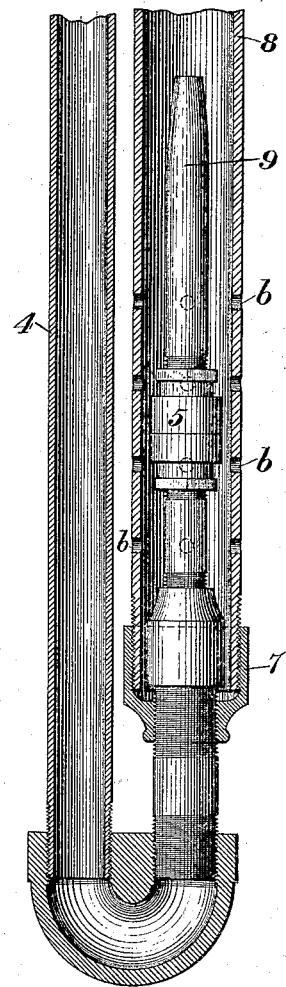
Figure 5:
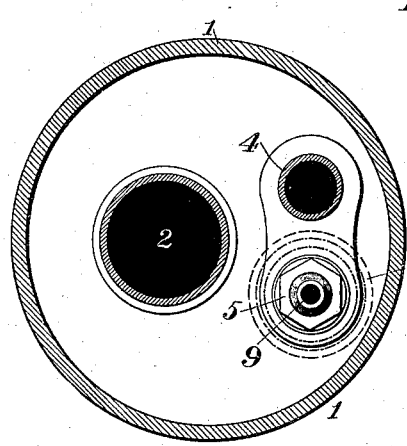

Figure 1 is a plan view of the casing-head of an oil-well provided with my improved apparatus. Fig. 2 is a vertical section of the casing-head on the line $x\,x$ of Fig. 1. Fig. 3 is a vertical section of an oil-well, illustrating my invention. Fig. 4 is a similar view showing a modification. Fig. 5, Sheet 2, is an enlarged horizontal section on the line $z\,z$ of Fig. 3. Fig. 6 is a vertical sectional view of a part. Fig. 7 is a view of a modified form of that part shown partly in vertical section.

Like symbols of reference indicate like parts in each.

Referring now to Figs. 4, 6, and 7 of the drawings, 1 indicates the casing, with which it is usual to line oil-wells down to a point below the fresh or surface water veins, and 3 is the casing-head, situate above the ground-level at the upper end of the casing. A pipe, 4, extends vertically through the casing and below it to the level of the oil-producing stratum at or near the bottom of the well, where it is reflexed, and terminates in an upwardly-directed nozzle, 9, Figs. 6 and 7. In the upward branch of the pipe, below the nozzle, is a ball or check valve, 5, which seats downward. Above the casing-head the pipe 4 is connected with a supply-pipe, 6, from a gas-producing well or other convenient gas-supply, so that gas shall be discharged at pressure through the pipe and out of the nozzle 9. Screwed to a nipple, 7, at the base of the nozzle 9, and extending thence upward and around the nozzle to the top of the well is an eduction-pipe, 8, which is perforated below the end of the nozzle, as at $b$, to afford free passage to the oil from the outside to the inside of the pipe. This pipe 8 is not a necessary element of my invention.

The operation is as follows: Gas having been admitted into the pipe 6 will flow therefrom through the pipe 4 to the bottom of the well, where it will be discharged in a jet from the nozzle 9 into the eduction-tube 8. The effect of this gas-jet is to induce a current of oil through the holes *b* into the eduction-tube 8, where, mingling with the oil, it will lighten it, as before described, and will eject it through this tube into the receiving-tank in the form of a light foam. The purpose of the tube 8 is to concentrate the force of the gas-jet, and to increase its efficiency; but where the supply of gas is great and the amount of oil produced by the well is considerable, this tube may be dispensed with, and the oil ejected up through the well-hole and the casing, as shown in Fig. 3. The purpose of the check-valve 5 is to prevent the backflow of oil into the tube 4 through the nozzle in case the gas-flow should be cut off.

In Figs. 1, 2, 3, and 5 I have shown my invention as applied to the use of drawing oil from the first or shallow sands of a well, when the oil from the deeper strata is self-flowing. It often happens that when a well is sunk through several oil-producing strata, the deep sands will emit enough gas to force their oil up through the tubing, while a smaller quantity of oil from the upper or shallow sands, not having sufficient gas to discharge, will accumulate in a dead body in the casing and around the tubing. I render such oil self-flowing by discharging a jet of gas into the casing at or below the level of the oil, which jet will act on the oil to lighten it and to raise it, as before described.

In Fig. 3, *a* is the shallow sand, and *c* is the deep sand. 2 is the tubing, which extends through the casing 1 and below it to the bottom of the well, through which tubing the oil flows or is pumped to the surface. 10 is a packer interposed between the tubing and the walls of the well, separating the deep sands from the strata above. The gas-pipe 4 in this case extends through the casing parallel with the tubing to the level of the oil from the shallow sands, where is situate the upwardly-directed nozzle 9. The jet of gas from this nozzle will raise the oil which is in the well and casing above the packer 10, and will eject it through the discharge-pipes 11 in the casing-head. Meanwhile the oil may flow through the tubing 2 from the deep sands quite independently of the auxiliary supply from the shallow sands, and if the quantity and pressure of gas from the deep sands be sufficient the gas may be drawn from the receiving-tank of the tubing back into and through the gas-pipe 4, and thus be employed for furnishing the power for drawing the oil from the shallow sands.

In the devices shown in Figs. 1, 2, and 3, where the oil is discharged directly through the casing, it is proper to employ a cap, 12, for the casing-head, and to arrange stuffing-boxes around the pipes where they pass through the cap, so as to prevent leaking of the oil or gas. Where, however, the eduction-pipe 8 is employed, as it may be in either of the forms shown in Figs. 3 or 4, no casing-head cap is necessary, as will be understood.

With wells of small capacity a discharge of gas for a very short time will be sufficient to clean out the oil in the hole. A single gas-supply pipe may therefore be connected with a large number of such wells, and by admitting gas into them successively the gas-supply may be economized.

I have my invention in successful operation, and have demonstrated its utility and economy.

I do not herein broadly claim the use of natural gas for elevating the oil of non flowing wells; but

I claim as my invention—

1. In the operation of oil-wells, the method herein described of raising the shallow-sand oils which accumulate above the packer, said method consisting in the admission thereto of natural gas under pressure, substantially as and for the purposes specified.

2. The method herein described of operating oil-wells wherein the lower-sand oils flow, which consists in returning the gases from the lower-sand oil into the casing above the packer, substantially as and for the purposes specified.

3. The method herein described of operating oil-wells, which consists in storing under pressure gas liberated from the flowing oil, and applying the same to the oil from non-flowing strata, substantially as and for the purposes specified.

4. The combination, in an oil-well having shallow and deep producing strata, and a tubing extending to the lower stratum, of a packer separating the lower stratum from the shallow producing stratum, and a pipe leading from the surface into the well and discharging gas at pressure thereinto above the packer, substantially as and for the purposes described.

In testimony whereof I have hereunto set my hand this 21st day of April, A. D. 1886.

CHARLES N. ROYCE.

Witnesses:
T. W. BAKEWELL,
W. B. CORWIN.